United States Patent [19]
Chierici

[11] 3,807,318
[45] Apr. 30, 1974

[54] RESILIENT HOPPER CAR OUTLET GATE SEAL

[75] Inventor: Osvaldo F. Chierici, Elmhurst, Ill.

[73] Assignee: Holland Company, Lombard, Ill.

[22] Filed: June 1, 1972

[21] Appl. No.: 258,603

[52] U.S. Cl............... 105/282 A, 105/299, 105/424
[51] Int. Cl......... B61d 7/04, B61d 7/20, B61d 7/22
[58] Field of Search.......... 52/717; 105/282 A, 424, 105/299; 280/150 B, 152 R; 302/52

[56] References Cited
UNITED STATES PATENTS

| 2,020,863 | 11/1935 | Willoughby | 105/282 A |
| 2,161,837 | 6/1939 | Tell | 280/152 R |
| 743,504 | 11/1903 | Hart | 105/424 X |
| 2,020,880 | 11/1935 | Dietrichson | 105/282 A |
| 2,094,979 | 10/1937 | Dietrichson | 105/282 A |
| 2,263,063 | 11/1941 | Allen | 52/717 |
| 2,624,596 | 1/1953 | Clingman | 280/150 B |
| 3,596,611 | 8/1971 | Floehr | 105/424 X |
| 3,635,170 | 1/1972 | Chierici | 105/282 A |

Primary Examiner—Gerald M. Forlenza
Assistant Examiner—Howard Beltran
Attorney, Agent, or Firm—Mann, Brown, McWilliams & Bradway

[57] ABSTRACT

A resilient top seal for hopper car outlet gates comprising a seal strip formed in open centered quadrilateral shape to fit about the hopper outlet just above the gate and define a mounting portion adapted to engage the respective hopper walls, and a sealing lip portion that overhangs the outlet discharge opening, in which the mounting portion is formed from a relatively stiff polyurethane material and has embedded in same mounting plates that are made fast to the polyurethane material by the embedding rather than bonding, and are equipped with bolts having their heads embedded in the polyurethane material and extending outwardly of the underside of the strip for securing same to the hopper, with the sealing lip portion being a relatively flexible polyurethane material for deflection under the weight of the bulk material in the hopper into sealing relation with the gate. The urethane materials are adhered together by affinity rather than bonding.

9 Claims, 4 Drawing Figures

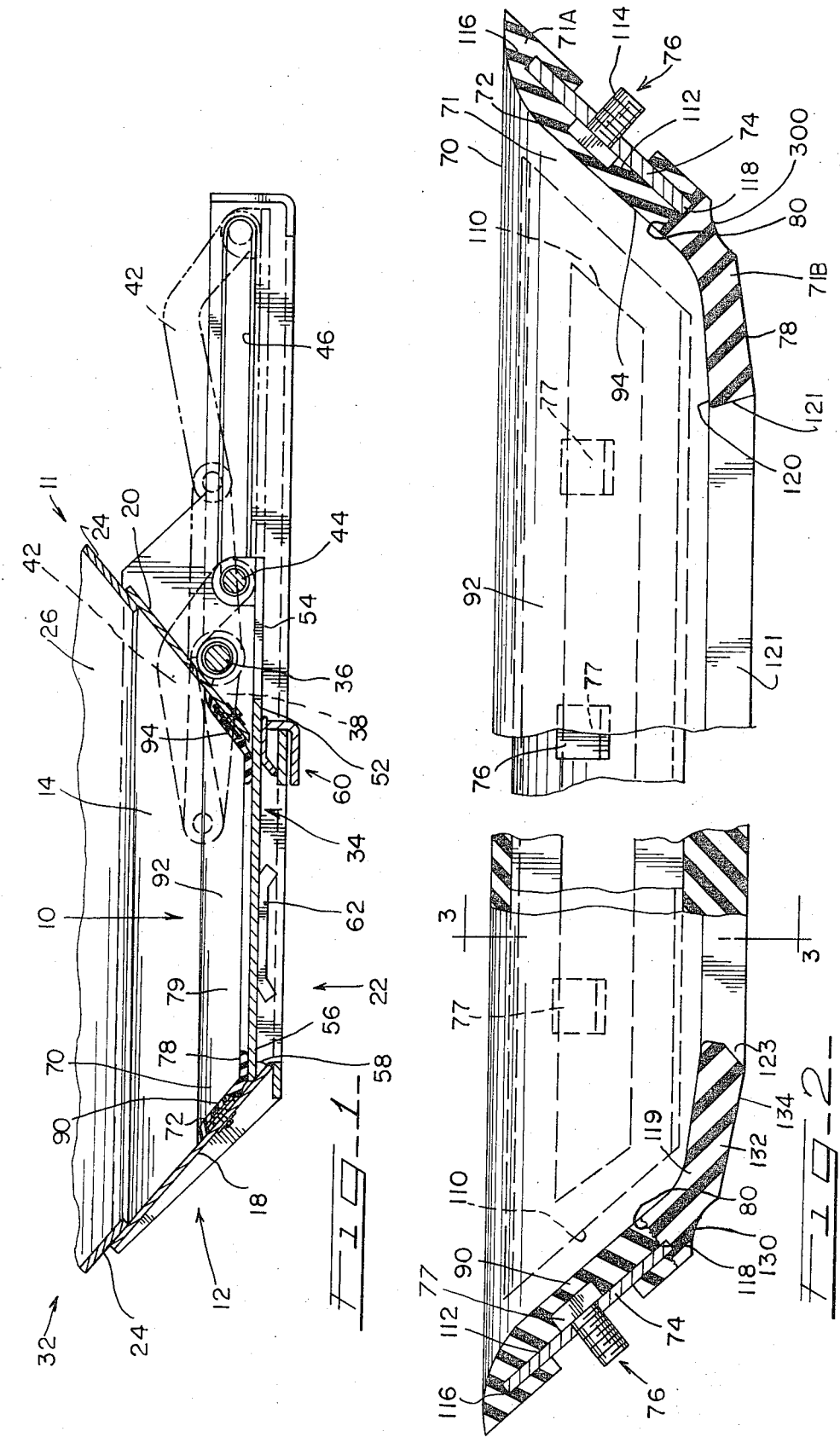

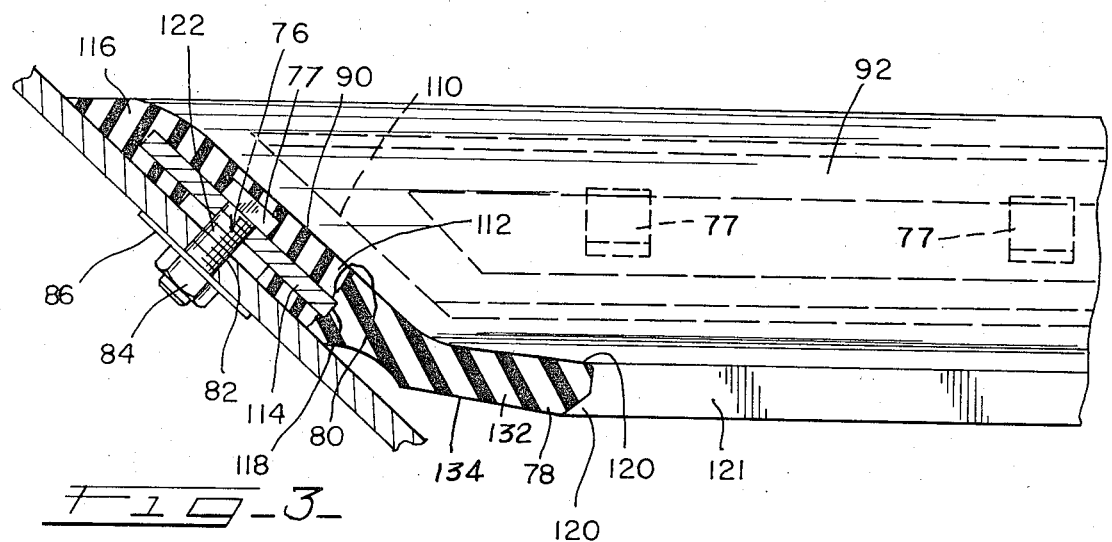
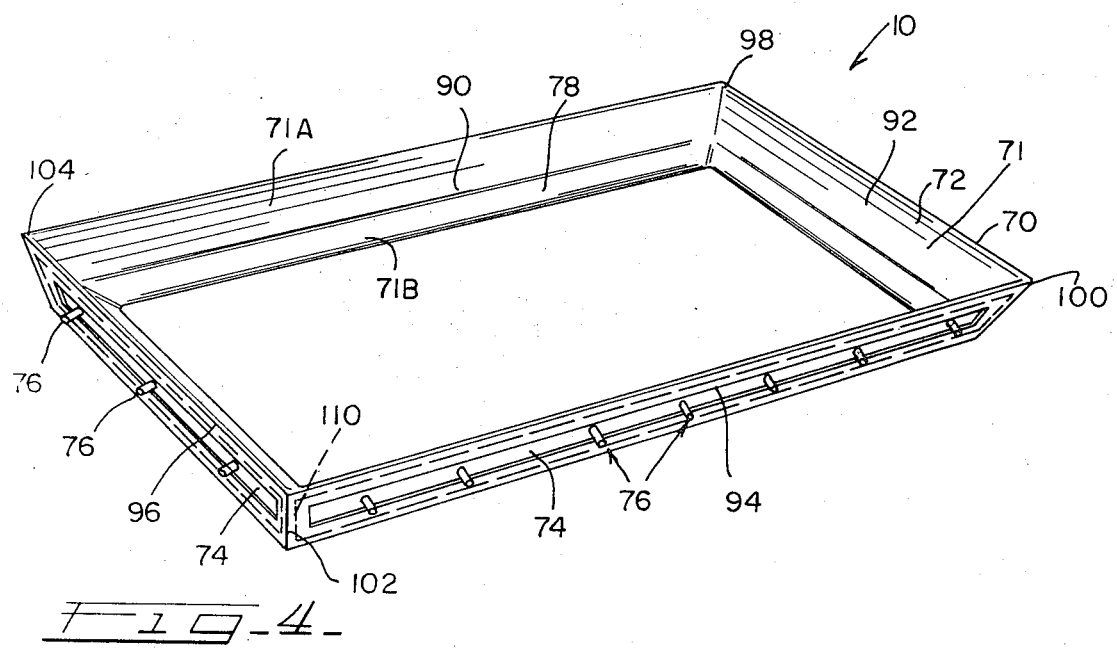

3,807,318

RESILIENT HOPPER CAR OUTLET GATE SEAL

TOP SEAL FOR HOPPER CAR OUTLET GATES

This invention relates to a top seal for hopper outlet gate assemblies, and more particularly, to improvements in seals of the type disclosed in my Pat. No. 3,635,170, granted Jan. 18, 1972.

The seal arrangement of my said patent is in the form of a flexible seal strip secured about the inside of the hopper and just above the hopper outlet opening and adjacent the path of movement of the gate (which closes the outlet opening), in which the inner border of the seal strip forms a flexible sealing lip that overhangs the margin of the hopper discharge opening and engages the upper surface of the gate when the gate is in its closed position. As disclosed in said patent, this enables the weight of the bulk material in the hopper above the seal strip to hold the sealing lip in sealing engagement with the gate.

A principal object of this invention is to generally improve the seal of my said patent.

Another principal object of the invention is to simplify the manner of securing the strip in place while insuring that the sealing material will be firmly anchored against separation from the hopper walls.

Another principal object of the invention is to provide a sealing strip of the type in which the mounting and lip portions of same are relatively stiff and are relatively flexible, respectively, utilizing different durometer urethane materials of the same type that are made fast to each other by affinity.

Other objects of the invention are to provide a backing plate arrangement for the seal strip which avoids having to bond the urethane material to the backing plates, to provide a sealing lip configuration that avoids upward tilting of the lip from its design position during manufacture as the result of material shrinkage, and to provide a seal arrangement for hopper car outlet gates that is economical of manufacture, convenient to install, and long lived in operation.

In accordance with this invention, a top seal for hopper car outlet gates is provided comprising a seal strip in quadrilateral open centered form proportional to fit about the hopper outlet just above the gate and define a mounting portion adapted to engage the respective hopper walls and a lip portion that overhangs the outlet discharge opening. The seal strip mounting portion is formed from a relatively stiff polyurethane material that has embedded in same mounting plates that extend along the sides of the seal which are made fast to the polyurethane material by the embedding rather than by bonding, and are equipped with bolts having their heads embedded in the polyurethane material on the upper side of the backing plates and having their shanks extending outwardly of the underside of the strip for application to holes formed in the hopper wall for securing the seal strip to the hopper. The seal strip lip portion is formed from a relatively flexible polyurethane material to be responsive to the weight of the bulk material of the hopper that bears on same to bias the lip portion into sealing engagement with the gate. The two polyurethane materials are adhered together by affinity as part of the procedure of making the seal strip during the course of which the two materials are molded together in the same mold.

When the seal strip is secured in place within the hopper, portions of the sealing material are interposed between the mounting plates and the hopper walls for good sealing action at this point, while the relatively flexible sealing lip is formed to engage the gate when the gate is in its closed position, and be biased thereagainst by the weight of the bulk material of the hopper that bears against the seal to effect a positive seal about the margins of the gate.

Other objects, uses, and advantages will be obvious or become apparent from a consideration of the following detailed description and the application drawings. In the drawings:

FIG. 1 is a diagrammatic vertical sectional view of the outlet gate arrangement shown in my said patent, with the seal of this invention applied thereto, with the section being along the path of movement of the gate, and showing the gate in its closed position in full lines and in its open position in broken lines;

FIG. 2 shows the seal strip per se in the sectional form shown in FIG. 1, but with parts broken away, and on an enlarged scale;

FIG. 3 is a sectional view through the seal strip as viewed along line 3—3 of FIG. 2; and FIG. 4 is a diagrammatic perspective view of the seal strip per se.

However, it is to be understood that the specific drawing illustrations provided are supplied primarily to comply with the requirements of the Patent Laws, and that the invention may have other embodiments that will be obvious to those skilled in the art, and which are intended to be covered by the appended claims.

GENERAL DESCRIPTION

Reference numeral 10 of FIG. 1 generally indicates a preferred embodiment of this invention applied to the hopper outlet gate assembly 11, which is of the type disclosed in my said patent, and comprises a frame 12 formed by a pair of longitudinal frame members 14 (only one is shown due to the sectional showing of FIG. 1) joined together with a pair of transverse frame members 18 and 20 to define a hopper outlet opening or port 22. As indicated in FIG. 1, the frame 12 is attached to the lower edges of the hopper car sheets 24 and 26 that define a railroad car hopper 32, the frame members 14, 18 and 20 being formed to provide continuations of the respective hopper sheets that converge in the direction of the outlet opening or port 22.

Slidably mounted in the frame 12 is outlet gate 34 that is actuated by an operating shaft 36 journaled between the longitudinal frame members 14 and located adjacent the transverse frame member 20 in the hopper outlet opening or port 22.

The gate 34 is mounted for sliding movement between its open and closed positions, the operating shaft 36 being effective to move the gate between its open and closed positions through a pair of crank arms or levers 38 fixed to either end of same which are respectively pivotally connected to a pair of thrust arms 42 that are in turn pivotally connected to the opposed ends of a slide bar 44 that are slidably mounted in opposed slots 46 formed in the respective frame members 14. As disclosed in said patent, each crank arm 38 has fixed thereto a socket structure (not shown) adapted to receive one end of the familiar operator lever bar that is conventionally employed to operate outlet gates of railroad hopper cars, whereby the gate can be moved between its open and closed positions by effecting approximately a 180 degree pivotal action of operating shaft 36. The gate 34 has its rear end 52 connected to the slide bar 44 by connecting structures 54, and its forward end 56 engages supports 58 secured to the frame member 18 in the closed position of the gate. Gate 34 is supported from beneath by a support structure 60 that is connected between the frame member 14, and guide elements 62 on either side of the hopper outlet opening 22 (fixed to the respective members 14).

My said patent may be referred to for further details of the outlet gate assembly 11.

The seal device 10 generally comprises a seal strip 70 that is generally of quadrilateral configuration or outline (see FIG. 4) to conform to the shape of the hopper sheets in the area where the seal strip 70 is to be mounted, and is open centered in form to permit the materials carried in the hopper 32 to pass through the outlet gate opening or port 22.

The seal strip 70 comprises sealing material 71 that is of a composite nature shaped to define a mounting portion 72 in which are embedded mounting plates 74 equipped with securing bolts 76 for securing the seal strip 70 in place in the manner indicated in FIGS. 1 and 3. The seal strip 70 also comprises sealing lip portion 78 which, in accordance with my said patent, overlies the margin of the hopper outlet opening 22 and engages the upper surface 79 of the gate 34 when the gate is in its closed position.

In accordance with this invention, the seal strip portion 72 is formed from a relatively stiff polyurethane material while the lip portion 78 is formed from a relatively flexible polyurethane material, with the polyurethane materials involved being secured together by affinity along their point of merger, where indicated at 80.

Also, the backing plates 74 are not bonded to the seal strip materil, but rather are embedded in their operating positions, as indicated in FIGS. 2, 3 and 4.

The seal strip 70 is applied to the hopper by inserting the bolts 76 into correspondingly located openings 82 formed in the frame members 14, 18 and 20, and then applying suitable secuing devices thereto, such as nuts 84 applied against lock washers 86.

When seal device 10 is mounted as indicated in FIGS. 1 and 3, the seal lip portion 78 in its unstressed relation extends downwardly somewhat for sliding engagement with the upper surface 79 of the gate 34 when the gate is moved to its closed position. The weight of the lading received in the hopper that bears on the lip portion 78 holds the lip portion against the upper surface 79 of the gate to effect a positive seal about the margin of the gate. In addition, the portions of the seal mounting portion that are clamped between the mounting plates and the gate assembly frame members effect a positive seal at these areas.

SPECIFIC DESCRIPTION

As indicated in FIG. 4, the seal strip 70, in being quadrilateral in form, defines rectilinear sides 90, 92, 94 and 96, which are integrally united at the corners 98, 100, 102 and 104 of the seal strip to provide the quadrilateral open centered configuration that is indicated.

Each side of the seal strip includes its own mounting plate 74, which extends substantially the full length of same (note the dashed line showings of FIGS. 2 – 4), but has its end portions 110 stopped short of the respective corners of the seal, substantially as indicated in FIGS. 2 and 3. Ends 110 are also of mitered configuration to conform to the mitering of the seal strip corners.

As indicated in the drawings, the mounting plates 74 are embedded in the seal strip mounting portion 72 along the respective sides of the seal strip. As indicated, the upper sides 112 of the mounting plates 74 are completely covered by the seal stripping material and the seal stripping material also covers the margins of the underside 114 of same, about the upper and lower edges 116 and 118 of same and ends 110.

Bolts 76 preferably have heads 77 that are square in configuration, which heads 77 are also embedded in the urethane material.

The seal material 71 is preferably polyurethane or ts equivalent and the portion 71A of same forming the seal strip mounting portion 72 is preferably relatively stiff while the portion 71B of same forming the sealing lip portion 78 is relatively flexible. It is preferred that the material forming the mounting portion 72 have a durometer on the order of 90 while the material forming the sealing lip portion 78 have a durometer on the order of 55.

The seal strip 70 is preferably made by molding the portions 72 and 78, with the mounting plates 74 having their bolts 76 in place being appropriately mounted in the mold, and the polyurethane materials forming the portions 72 and 78 being applied to the mold at the same time so that they merge together along merge line 80. The polyurethane materials employed are of the same type of compositions that will provide the respective durometers that have been indicated. In practice the two materials merge together about the length of strip 70 approximately where indicated by merge line 80, without leaving any visible merge line unless the materials are of different colors. Thus, the polyurethane materials forming seal strip portions 72 and 78 are adhered together by chemical affinity rather than by any separate bonding material employed.

The mold employed is also formed so that the material employed to form the mounting portion 72 of the seal strip will be formed to the configuration indicated along the underside 114 of the mounting plate 72, whereby the margins of the ends 110 and sides 116 and 118 of the mounting plates are covered in the manner indicated in FIGS. 2, 3 and 4. This firmly anchors the mounting plates 74 within and to the seal strip without having to bond the sealing material 71 thereto.

This is an important advantage because of the reduction in labor required to make the seal. To provide a bonded connection between the sealing material and the mounting plates 74, which are preferably formed steel, involves de-scaling of the metal, chemically treating the metal to free its surface from all impurities on it, coating the surface of the metal with a bonding agent of the type that adheres to steel, and then applying another coating on over the first coating of the type that will bond to the material forming the seal material 71.

As indicated in FIGS. 2 and 3, the sealing portion 78 has a thickness that increases, in vertical section, in the direction of its inner marginal edge portion 120. In practice, a difference of about one-eighth of an inch between its edge portion 120 and its base portion 119 will be satisfactory. This has been found to overcome the tendency of the lip portion 78 to flex upwardly, from the preferred position shown in FIGS. 2 and 3, as a result of shrinkage after molding, which shrinkage can be on the order of 2 percent. The thickening of the lip inner edge 120 appears to supply sufficient body to the lip at this point to overcome a tendency of the lip to uplift as a result of shrinkage.

The lip portion 78 preferably has the downwardly inclined shape in its free relation that is shown in FIGS. 2 and 3 so that the lip portion 78 will have a bias against the gate when the gate is in its closed position, and to avoiding retaining any significant amount of bulk material thereon after discharge of a load through port 22. The edge 120 of lip portion 78, of its side 90, is beveled as at 123 for guiding cooperation with the gate while the edge 120 of sides 92, 94 and 96, is squared off, as indicated at 121, along edge 120 thereof. At side 94 of strip 70, which is to be located at the right hand side of outlet opening 22, the squared off configuration insures a wiping off of the gate as it is opened.

Bolts 76 include the usual shank 122 that is threaded for application of a suitable fastening device, such as nut 84. Lock washers 86 may be of any suitable type.

As indicated, the mounting portion 72 of the seal strip 70 along the respective side of the seal strip is generally flat in configuration. It is preferable that the urethane material forming lip portion 78 extend into the plane of the mounting portion 72, along the respective sides of the seal strip 70, so that the softer material is operative about a fulcrum that is aligned with the plane of the mounting portion 72 along the respective sides of the seal strip. Strip 70 is scalloped or recessed thereabout along the outer side of base portion 119, of lip 78, as at 130, so as to define the fulcrum about which lip 78 operates. Lip portion 78 is thus anchored to the mounting portion 72 at merge line 80 and projects centrally of the outlet opening 22, and in substantial parallelism to same, to define a marginal flap 132, the undersurface 134 of which is biased against the upper surface 79 of the gate 34 in effecting the seal contemplated by this invention.

As indicated, the mounting plates 74 have their ends 110 spaced apart at the corners of the seal strip, and the seal material forming the mounting portion 72 of the seal strip is sufficiently flexible to accommodate tolerance variations at the hopper corners.

The foregoing description and the drawings are given merely to explain and illustrate the invention and the invention is not to be limited thereto, except insofar as the appended claims are so limited, since those skilled in the art who have th disclosure before them will be able to make modifications and variations therein without departing from the scope of the invention.

I claim:

1. A top seal for hopper outlet gate assemblies defining a funneling portion formed by four planar sheets in downwardly converging relation and forming an outlet opening, and a gate movable across said opening to open and close same, said top seal arrangement comprising:

a seal strip formed to fit into and complement the assembly funneling portion and disposed adjacent to but above the outlet opening, said strip being of open centered quadrilateral configuration defining rectilinear sides merging into corners at adjacent ends of the respective sides, said strip comprising a stripping of resilient flexible material sealing material formed to define for each side of the strip a mounting portion of generally flat contour and angled to substantially complement the assembly funneling portion sheet that the respective strip sides are to engage, and an inwardly projecting lip portion proportioned to overhang the margin of the outlet opening, said lip portion of each strip side defining a flap that projects centrally of the strip open center beyond the plane of the mounting portion thereof and substantially parallel to the plane of strip open center, said flaps defining an upwardly facing side adapted to be engaged by the lading when in the funneling portion, and a downwardly facing side disposed for face to face engagement with the gate of the assembly to which the seal is applied, when such gate closes the assembly opening, said mounting portion along each strip side having a generally flat backing plate embedded therein with the backing margins being covered by said sealing material on the underside of same whereby said backing plates are mechanically connected to the respective strip sides, each of said backing plates having one or more mounting bolts extending therethrough with said bolts having their heads of polygonal configuration that are embedded in said sealing material above the respective backing plates and shanks that project through the respective backing plates for application through holes formed in the gate assembly sheets, said strip mounting portions being relatively stiff and said strip lip portions being relatively flexible, said stripping being of one piece construction with said portions of each side thereof being adhered by affinity between the two.

2. The seal set forth in claim 1 wherein:

said sealing material is polyurethane, and said strip mounting portions have a durometer on the order of 90 and said lip portions have a durometer on the order of 55.

3. The seal set forth in claim 2 wherein:

said flaps are of tapered transverse cross-sectional configuration with the thicker portion being at the free edges of same, whereby tendencies of said flaps to flex upwardly of said strip open center due to shrinkage are avoided.

4. The seal set forth in claim 1 wherein:

said backing plates terminate short of said strip corners whereby adjacent ends of said backing plates are spaced apart at said strip corners to accommodate tolerance variations at the corresponding corners of the hopper assembly to which the seal is applied.

5. In a hopper outlet gate assembly defining a funneling portion formed by four planar sheets in downwardly converging relation and forming an outlet opening, and a gate movable across said opening to open and close same, a top seal arrangement therefor comprising:

a seal strip formed to fit into and complement the assembly funneling portion and disposed adjacent to but above the outlet opening, said strip being of open centered quadrilateral configuration defining rectilinear sides merging into corners at adjacnet ends of the respective sides, said strip comprising a stripping of resilient flexible material sealing material formed to define for each side of the strip a mounting portion of generally flat contour and angled to substantially complement the assembly funneling portion sheet that the respective strip sides engage, and an inwardly projecting lip portion overhanging the margin of said opening, said lip portion of each strip side defining a flap that projects centrally of the strip open center beyond the plane of the mounting portion thereof and substantially parallel to the plane of the outlet opening, said flaps defining an upwardly facing side adapted to be engaged by the lading and a downwardly facing side disposed for face to face engagement with the gate when the latter closes said opening, said mounting portion along each strip side having a generally flat backing plate embedded therein with the backing margins being covered by said sealing material on the underside of same whereby said backing plates are mechanically connected to the respective strip sides, each of said backing plates having one or more mounting bolts extending therethrough with said bolts having heads of square configuration that are embedded in said sealing material above the respective backing plates through holes formed in the gate assembly sheets, nut means applied to the respective bolt shanks to fix said seal strip in place within the gate assembly, said strip mounting portions being relatively stiff and said strip lip portions being relatively flexible, said strip being of one piece construction with said portions of each side thereof being adhered by affinity between the two.

6. The seal set forth in claim 5 wherein:

said seal material is polyurethane, and said strip mounting portions have a durometer on the order of 90 and said lip portion have a durometer on the order of 55.

7. The seal set forth in claim 5 wherein:

the flap of the side of said seal under which the forward edge of the gate moves in moving toward the closed position of the gate is tapered for being cammed upwardly on camming engagement therewith by the gate.

8. The seal set forth in claim 7 wherein:

the flap of the side of said seal toward which the forward edge of the gate moves in moving toward the open position is squared off for wiping engagement with the gate.

9. The seal set forth in claim 5 wherein:

said flaps are of tapered transverse cross-sectional configuration with the thicker portion being at the free edges of same, whereby tendencies of said flaps to flex upwardly of the outlet opening due to shrinkage are avoided.

* * * * *